J. RITTER.
CONSTRUCTION OF VESSELS.
APPLICATION FILED MAY 15, 1912.
1,160,763.
Patented Nov. 16, 1915.
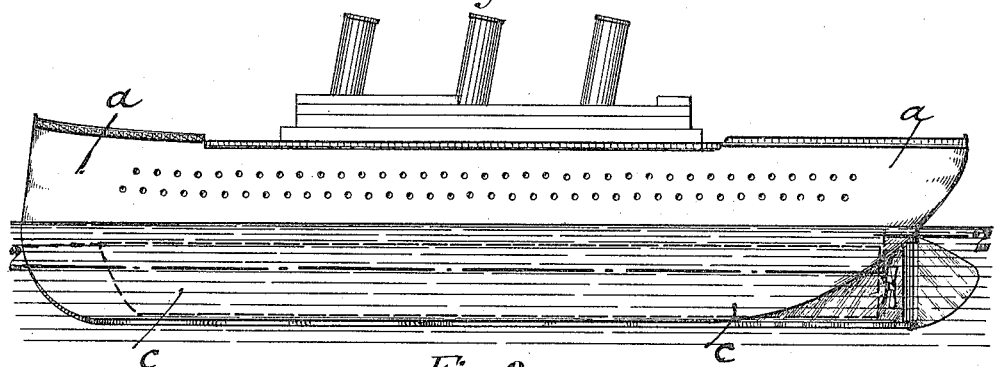
Fig. 1.
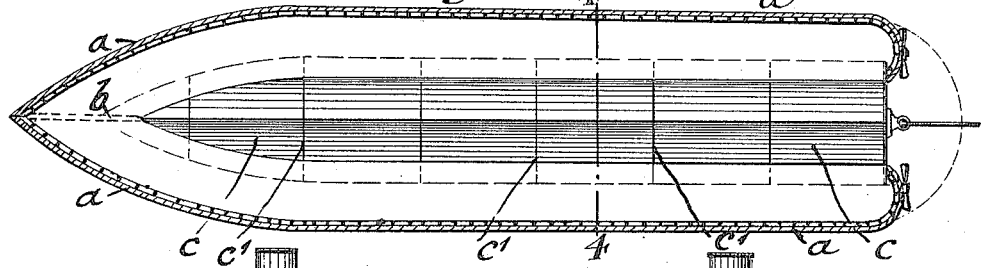
Fig. 2.
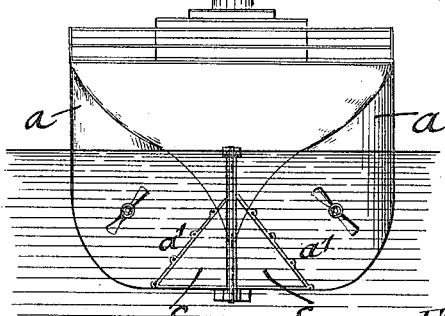
Fig. 3.
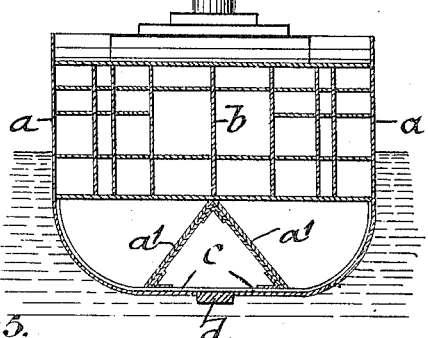
Fig. 4.
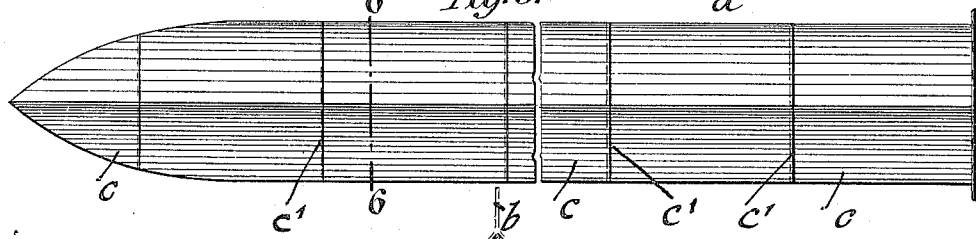
Fig. 5.
Fig. 6.
Witnesses:
John Murtagh
M. A. Dillon
Inventor
Jacob Ritter
By his Attorney
Joehel Goepel
COLUMBIA PLANOGRAPH CO., WASHINGTON, D. C.

UNITED STATES PATENT OFFICE.

JACOB RITTER, OF NEW YORK, N. Y.

CONSTRUCTION OF VESSELS.

1,160,763.

Specification of Letters Patent.

Patented Nov. 16, 1915.

Application filed May 15, 1912. Serial No. 697,427.

*To all whom it may concern:*

Be it known that I, JACOB RITTER, a citizen of the United States of America, residing in New York, in the borough of Manhattan, county and State of New York, have invented certain new and useful Improvements in the Construction of Vessels, of which the following is a specification.

This invention relates to the construction of vessels and mainly to an improved construction of the hull of the same whereby a greater buoyancy is given to the vessel and greater protection against capsizing, foundering and sinking is imparted, so that the safety of the passengers on board of the vessel is increased and accidents prevented; and for this purpose the invention consists of a vessel which is divided by a central longitudinal bulkhead into two longitudinal sections which are provided, below the bulkhead, in their lower parts with a compartment having a straight transverse bottom adjacent to the keel, and converging sides extending from the bottom to the lower edge of the bulkhead. The invention consists further of a vessel the hull of which is provided with a water-tight compartment of triangular cross-section, which extends adjacent to the keel throughout the bottom part of the vessel from the bow to the stern, and which is provided with transverse partitions dividing the compartments into individual watertight chambers or sections.

In the accompanying drawings, Figure 1 represents a side-elevation of a steamship, the hull of which is constructed according to my invention, Fig. 2 is a plan-view, partly in a horizontal section, on line 2, 2, Fig. 1, Fig. 3 is a rear-elevation, showing the stern of the vessel, Fig. 4 is a vertical transverse section on line 4, 4, Fig. 2, Fig. 5 is a plan-view of the air and water-tight compartment located in the bottom of the vessel above the keel, and Fig. 6 is a vertical transverse section on line 6, 6, Fig. 5.

Similar letters of reference indicate corresponding parts throughout the different figures.

Referring to the drawings, $a$ represents the hull of a steamship or other vessel and $b$ a bulkhead which extends longitudinally through the vessel and which divides it in two symmetrical sections, each of which is provided with the usual complement of boilers, engines and propellers. The hull is divided by horizontal floors into a number of superposed stories, which are connected through openings and doors in the bulkhead $b$. In the lower part of the hull, adjacent to the keel of the same, is arranged a triangular water and air-tight compartment $c$, which is preferably made as a separate structure in such a manner that it extends from the straight rear-end at the stern, below the bulkhead, throughout the length of the vessel, to a point near the bow, being tapered at the front or bow end. The compartment $c$ is preferably triangular in cross-section, its apex being adjacent to the lower edge of the bulkhead, while the lower or straight portion or base rests on the keel $d$. The lower portions of the hull are preferably closed by inclined side-walls $a^1$, parallel with the side-walls of the compartment $c$ so as to permit the separate construction of the compartment and its introduction from the stern into the triangular space at the lower central portion of the hull and the forming of a double-walled bottom and side-walls for the air and water-tight compartment $c$ in the lower part of the hull. The compartment is preferably made of boiler-plate of suitable thickness, closed at the rear and front-ends and divided by a number of transverse partitions $c^1$ into a number of chambers, which form always a protection for the vessel, even if the hull should be injured at its sides, as the bottom compartment practically makes the vessel unsinkable and imparts sufficient buoyancy to the same for keeping it afloat. The longitudinal semi-sections of the vessel, separated by the bulkhead and the air and water-tight compartment, are of the usual approved interior construction and accessories, while the space in the lower parts of both sections is utilized for coal-bunkers, boilers, engines and independent propellers, so that the vessel can be propelled even if it should be disabled at one side or the other by injury to the hull boilers, engines or propellers. The double walls between the air and water-tight compartment and the semi-sections of the bulkhead impart great strength and resistance to the keel-portion of the hull, especially against collisions with vessels, ice-bergs and the like, while the sub-division of the compartment into separate air and water-tight sections insures the reliable and effective action of the compartment even if one or the other of the individual sections should be injured and placed out of use.

By the connection of the side-walls $a^1$ with the hull at the lower edge of the bilges, as shown in Figs. 3 and 4, space is economized for cargo; the compartment is rendered less vulnerable to penetration from the outside, as it is protected behind the bilges and the cargo therein; and the strength of the compartment walls is brought to the lower edge of the bilge, the compartment thereby forming a truss longitudinally of the bilges and imparting strength thereto, which materially stiffens the vessel at the bilges.

I claim:

A ship having a longitudinal bulkhead from bow to stern along the upper portion of the hull, longitudinal partitions diverging downward from the lower edge of said bulkhead and connected at their lower edges with the ship's bottom and forming therewith a triangular chamber extending from bow to stern, and an independent triangular tube composed of boiler metal and fitted within said triangular chamber, said tube serving the double purpose of a water-tight compartment and a stiffening truss.

In testimony that I claim the foregoing as my invention I have signed my name in presence of two subscribing witnesses.

JACOB RITTER.

Witnesses:
PAUL GOEPEL,
JOHN MURTAGH.

Copies of this patent may be obtained for five cents each, by addressing the "Commissioner of Patents, Washington, D. C."